United States Patent [19]

Navarro

[11] Patent Number: 5,708,902
[45] Date of Patent: Jan. 13, 1998

[54] MATTE BOX SUPPORT ASSEMBLY

[75] Inventor: Felipe Navarro, Granada Hills, Calif.

[73] Assignee: Panavision Inc., Woodland Hills, Calif.

[21] Appl. No.: 647,240

[22] Filed: May 9, 1996

[51] Int. Cl.⁶ .................................................. G03B 11/00
[52] U.S. Cl. ........................................................ 396/544
[58] Field of Search ...................................... 396/544, 545

[56] References Cited

U.S. PATENT DOCUMENTS

| | | | |
|---|---|---|---|
| 4,007,471 | 2/1977 | Land et al. | 354/295 |
| 4,383,735 | 5/1983 | Stravitz | 354/295 |
| 4,390,242 | 6/1983 | Tatsumi | 350/318 |
| 4,669,846 | 6/1987 | Koch et al. | 354/295 |
| 4,687,312 | 8/1987 | Navarro | 396/544 |
| 4,752,798 | 6/1988 | Chrosziel | 354/287 |
| 4,901,098 | 2/1990 | Salles | 354/295 |
| 5,040,011 | 8/1991 | Tiffen | 354/295 |
| 5,105,312 | 4/1992 | Tiffen et al. | 359/892 |
| 5,164,755 | 11/1992 | King | 354/295 |
| 5,208,624 | 5/1993 | MacKay | 354/295 |
| 5,349,411 | 9/1994 | Beauviala | 396/544 |
| 5,359,380 | 10/1994 | Mathias | 354/295 |

FOREIGN PATENT DOCUMENTS

| | | |
|---|---|---|
| 0083430 | 7/1983 | European Pat. Off. |
| 2620833 | 3/1989 | France |
| 2074330 | 10/1981 | United Kingdom |
| 2097546 | 11/1982 | United Kingdom |
| 9221053 | 11/1992 | WIPO |

OTHER PUBLICATIONS

Arri Spare Parts list from the Arri Photographic Equipment Manual, pp. 10, 10A, 39–45, 62–66 and 69.
Arri Techn.—Information brochure.
Alfred Chrosziel Film–Technik GMBH brochure.

*Primary Examiner*—David M. Gray
*Attorney, Agent, or Firm*—Lyon & Lyon LLP

[57] ABSTRACT

A camera system including a matte box assembly for use on cameras for supporting a plurality of filters, the matte box assembly includes a support bracket which supports the matte box and which (1) axially translates toward and away from the lens and (2) in a separate action, once it has been axially translated to a given position away from the lens, the support bracket pivots 90° away from the lens. The assembly includes a crank arm for actuating both the axial translation and the pivoting action sequentially.

28 Claims, 14 Drawing Sheets

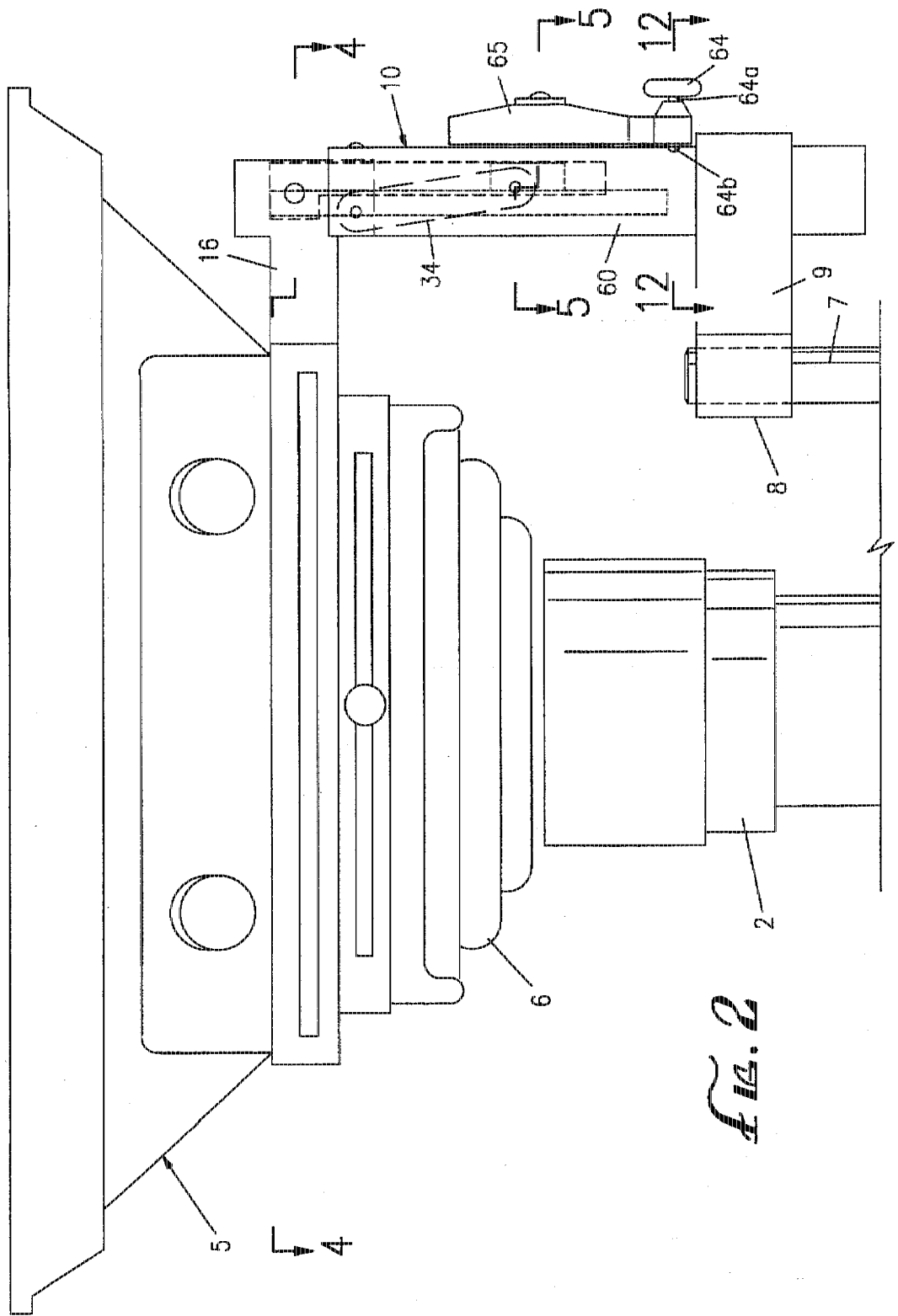

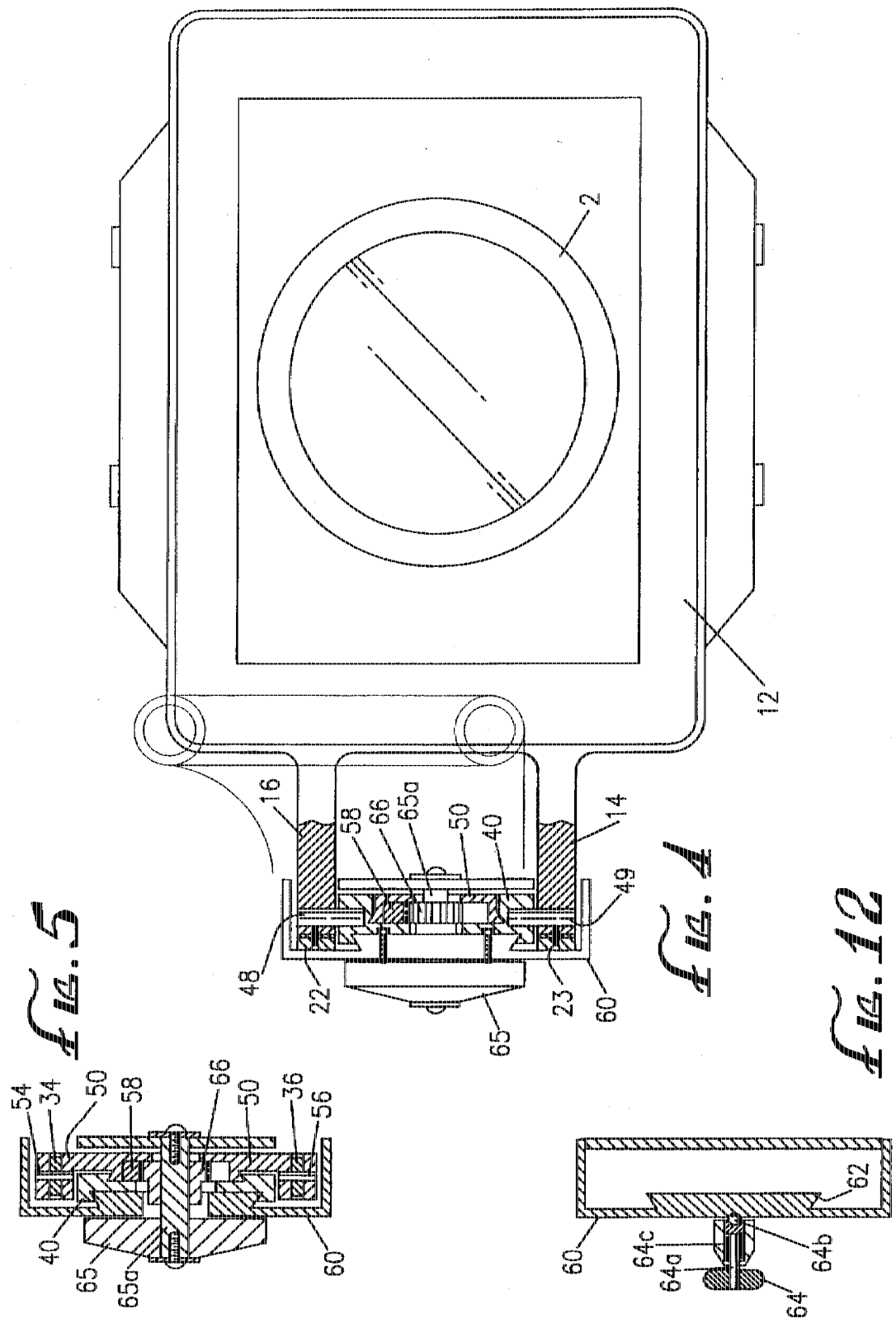

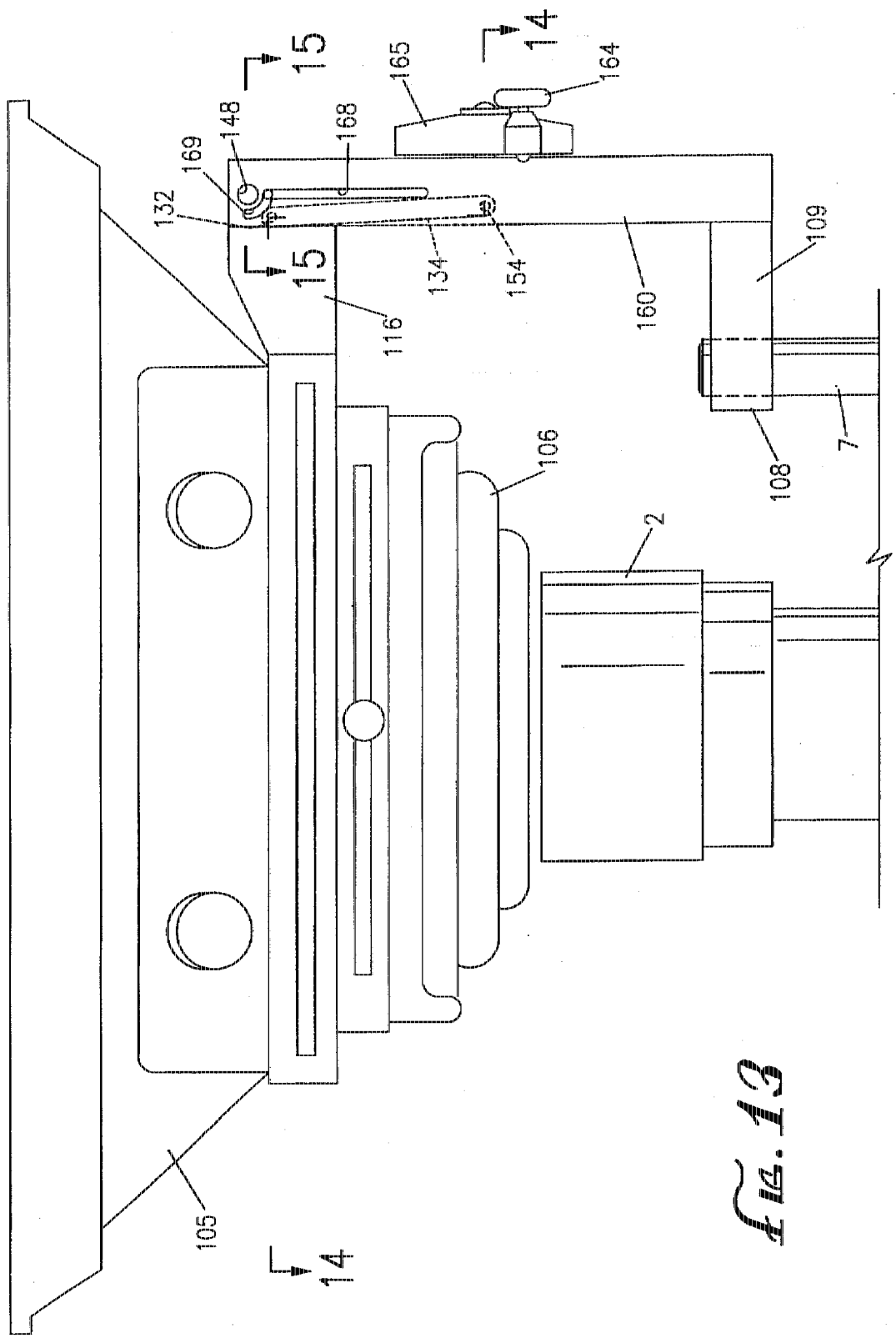

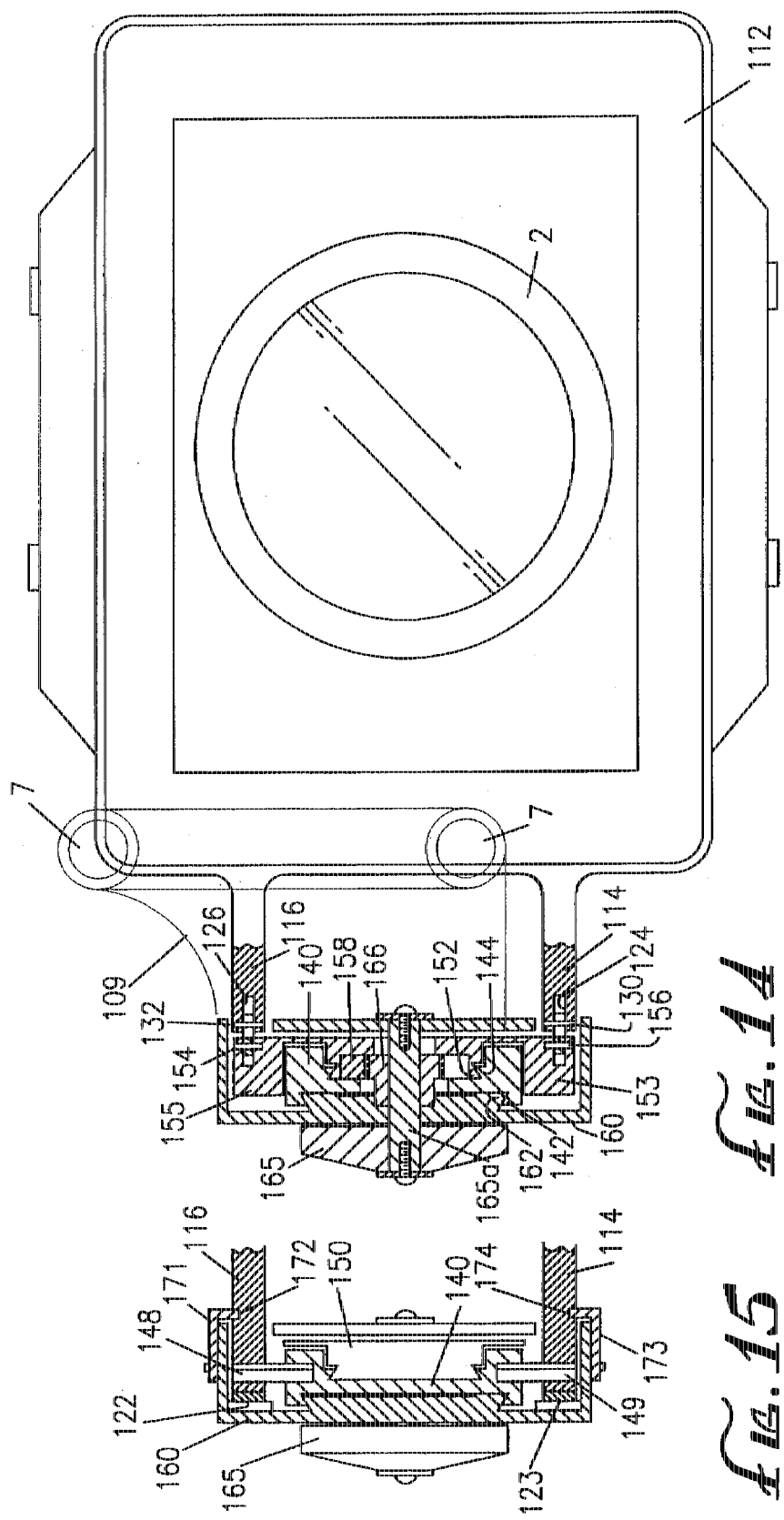

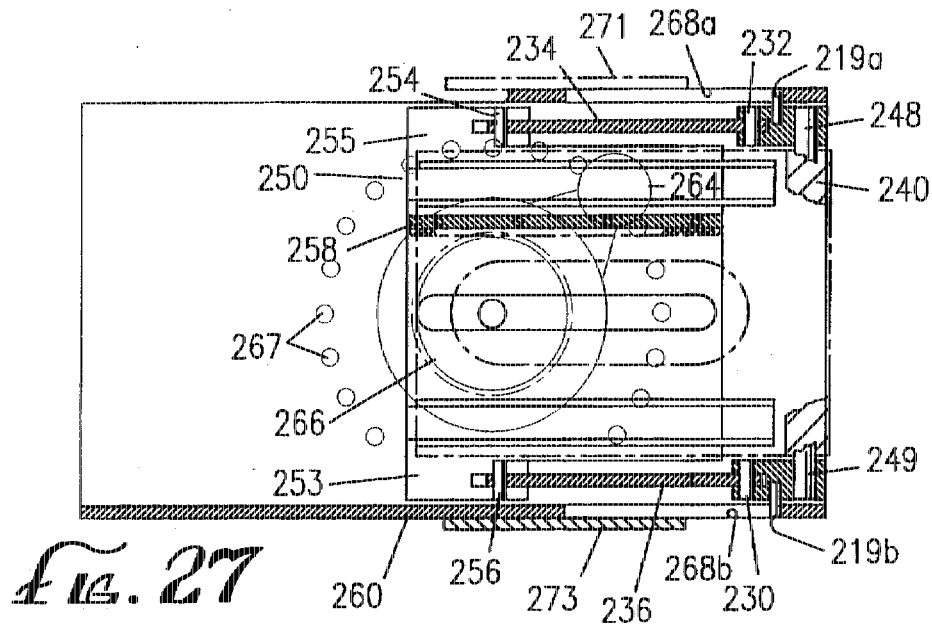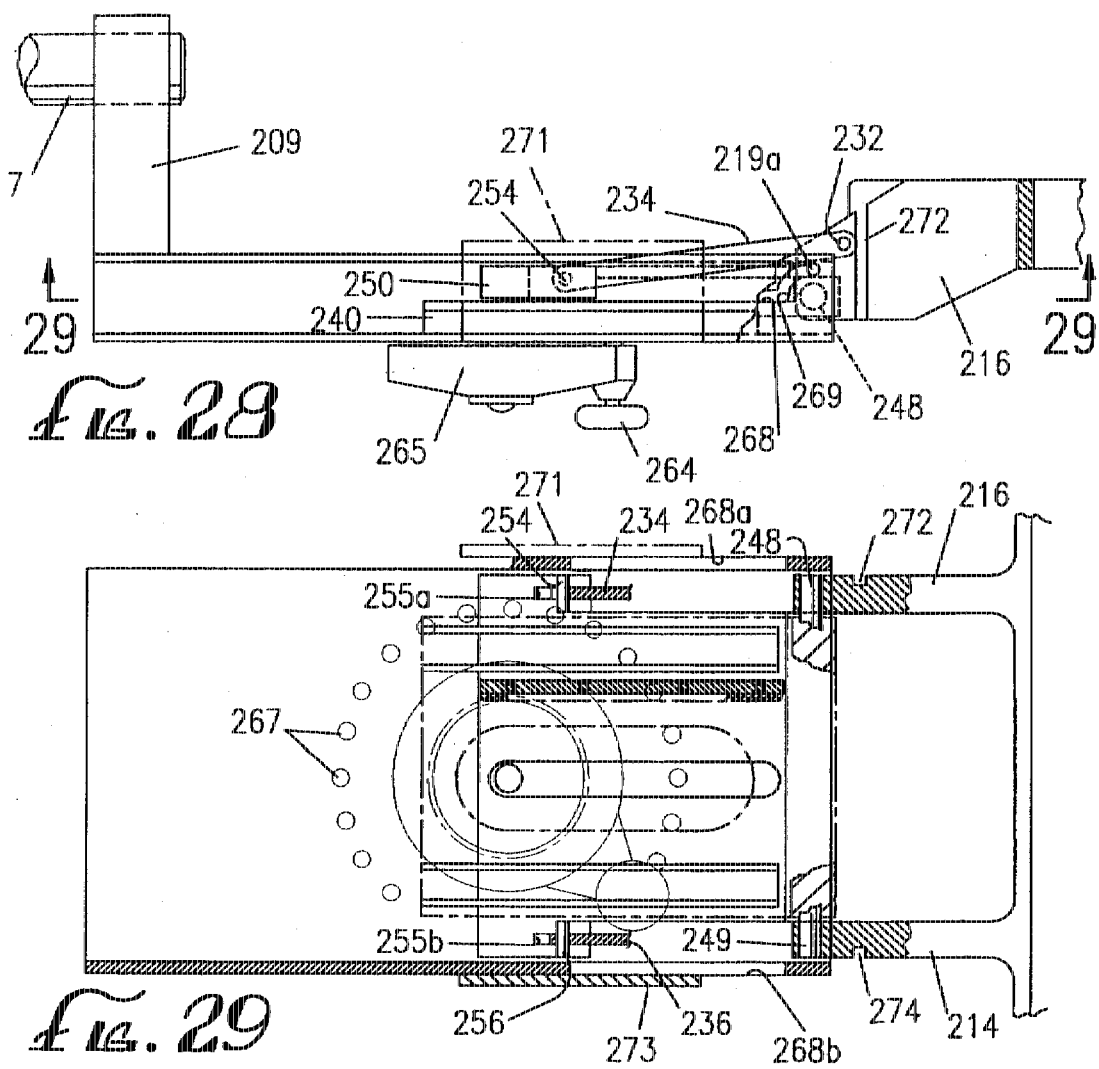

MATTE BOX SUPPORT ASSEMBLY

BACKGROUND OF THE INVENTION

The field of the present invention relates to a filter and matte box support assembly for use with a matte box on a camera and, in particular, for use on professional motion picture or video cameras requiring a variety of different filters to achieve the desired high quality filming results.

In the typical professional motion picture/video camera system, the camera lens is removably mounted to the body of the camera. The matte box containing the filters is usually a bulky and relatively heavy unit which needs to be mounted on front of the lens. Because of its weight, the matte box assembly is generally not attached to or supported by the camera lens but mounted independently therefrom. The matte box is equipped with a support bracket which independently mounts on iris rods mounted to the camera body or to the camera support such as the tilt head. The support bracket includes locking collars which lock onto the iris rods. The axial position of the matte box is adjusted by loosening the locking collars and sliding the bracket to the desired axial position and tightening the locking collars to lock the bracket in position.

To adjust the axial spacing of the matte box to a desired position relative to the lens (such as when adding or removing filters), the locking collars must be unlocked, the matte box assembly moved forward or rearward to the desired position, and the locking collars relocked at the new position. To facilitate access to the lens and the filters (such as when changing lenses), some matte box designs permit the matte box to be pivoted about the support bracket away from the lens. In order for the assembly to be pivoted, the locking collars must be unlocked and the matte box assembly moved forward to provide clearance between the matte box and the lens. Once clear of the lens, the collars are locked and a locking element on the assembly is released to allow the matte box to pivot away from the lens. The present inventor has recognized that the locking and unlocking of the collars is inconvenient and time consuming and that it would be desirable to provide a mechanism that would facilitate axial position adjustment and pivoting action.

SUMMARY OF THE INVENTION

The present invention relates to an improved camera system including a matte box support assembly that combines a pivoting structure for the matte box with a structure that provides convenient axial position adjustment. In its preferred configuration, a single actuator axially translates the matte box to a given maximum position and then pivots the matte box clear of the lens.

BRIEF DESCRIPTION OF THE DRAWINGS

FIG. 3 is a partially exploded, perspective view of a matte box assembly according to a preferred embodiment of the present invention;

FIG. 4 is a cross-sectional view of the assembly of FIG. 2 taken along line 4—4;

FIG. 5 is a cross-sectional view of the assembly of FIG. 2 taken along line 5—5;

FIG. 12 is a cross sectional view of the assembly of FIG. 2 taken along line 12—12;

FIG. 13 is a top plan view of an alternate embodiment of a matte box assembly with the matte box axially adjacent the lens;

FIG. 14 is a cross sectional view of FIG. 13 taken along line 14—14;

FIG. 15 is a cross sectional view of FIG. 13 taken along line 15—15;

FIG. 27 is a cross sectional view of FIG. 26 taken along line 27—27;

FIG. 28 is a detailed top plan view of the crank arm portion of the assembly in the fully pivoted position;

FIG. 29 is a cross sectional view of FIG. 28 taken along line 29—29;

FIG. 30 is cross sectional view of the crank arm portion of FIG. 22 taken along line 30—30.

DETAILED DESCRIPTION OF THE PREFERRED EMBODIMENTS

Figure 1A:
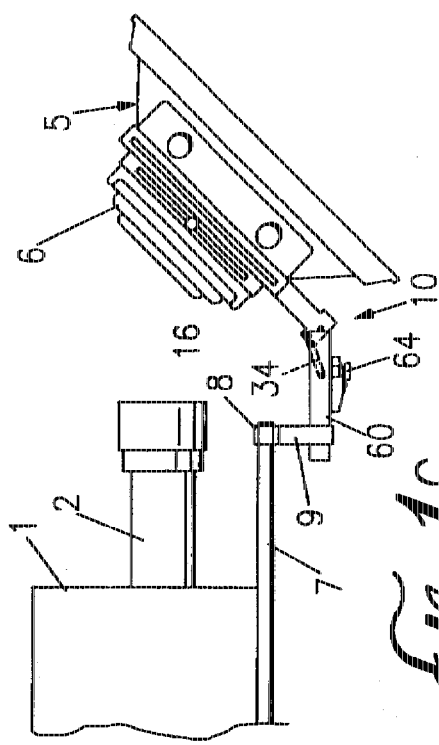
FIG. 1A is a top plan view of a camera system with matte box assembly according to the present invention with the matte box in position over the lens.

The preferred embodiment of the present invention will now be described with reference to the drawings. To facilitate the description, a reference numeral representing an element in one figure will represent the same element in any other figure.

Figure 1B:
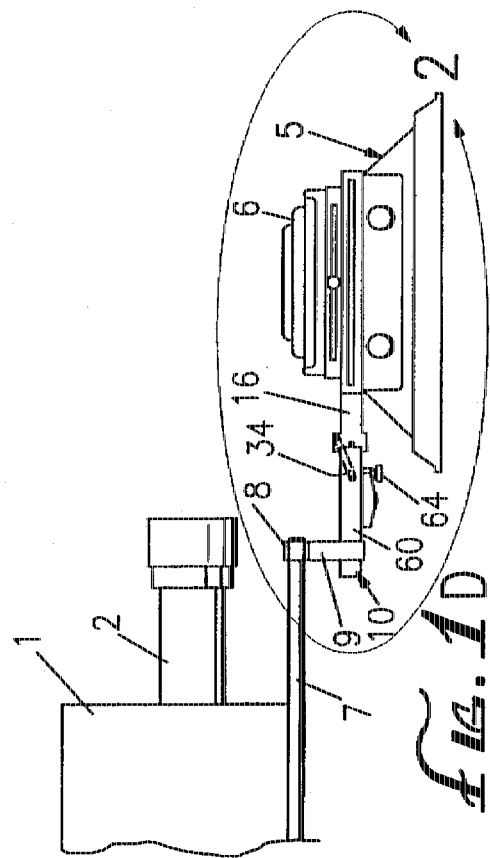
FIG. 1B is a top plan view of the camera system of FIG. 1A with the matte box moved axially away from the lens.
Figure 1C:
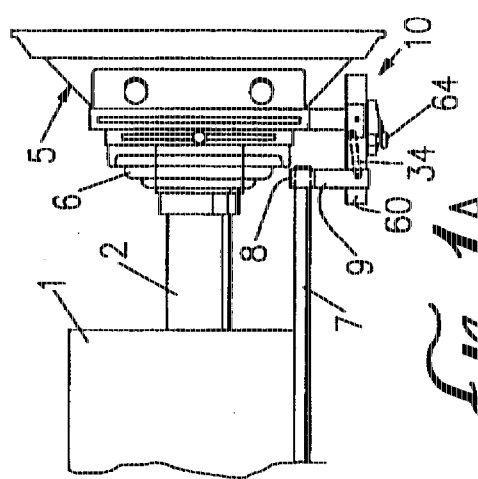
FIG. 1C is a top plan view of the camera system of FIG. 1B with the matte box pivoted 45° away from the lens.
Figure 1D:
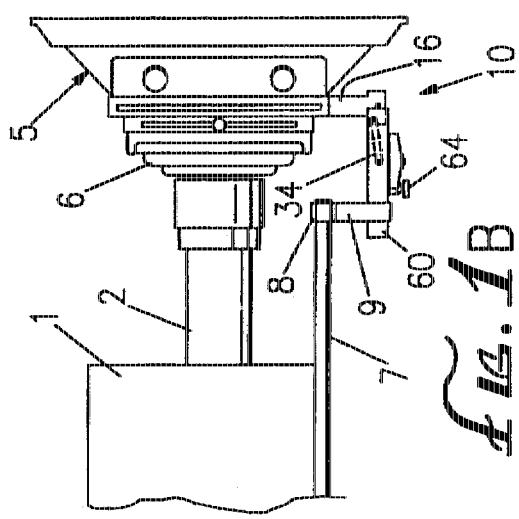
FIG. 1D is a top plan view of the camera system of FIG. 1B with the matte box pivoted 90° away from the lens.
Figure 2:
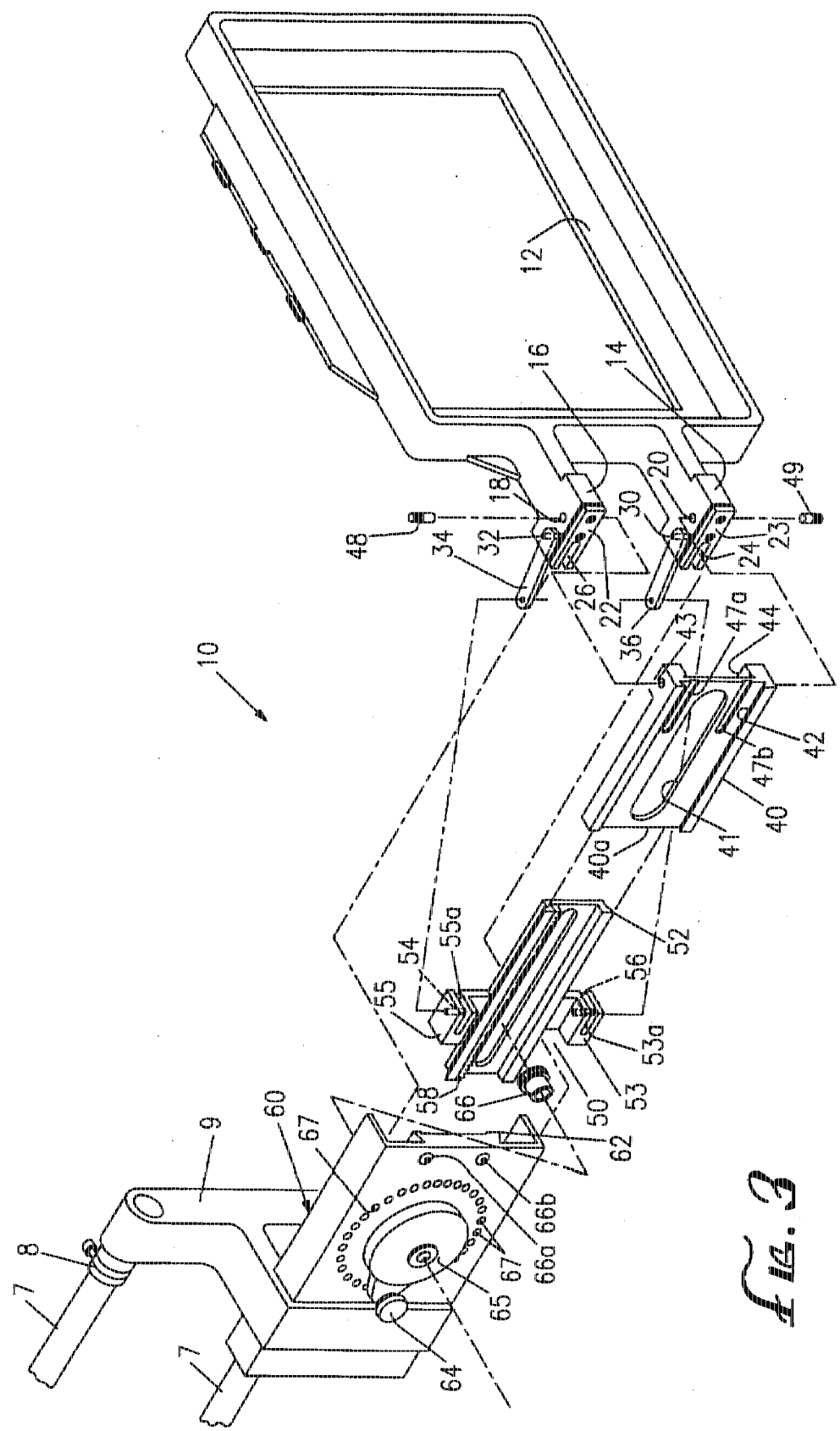
FIG. 2 is an enlarged top plan view of matte box assembly of FIG. 1B.
Figure 6:
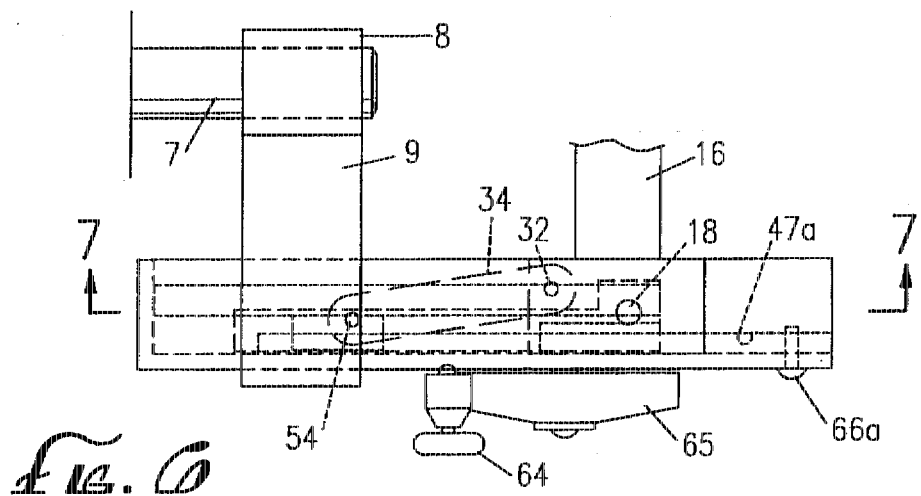
FIG. 6 is a detailed top plan view of the crank arm portion of the assembly in the position as in FIG. 1A.
Figure 7:
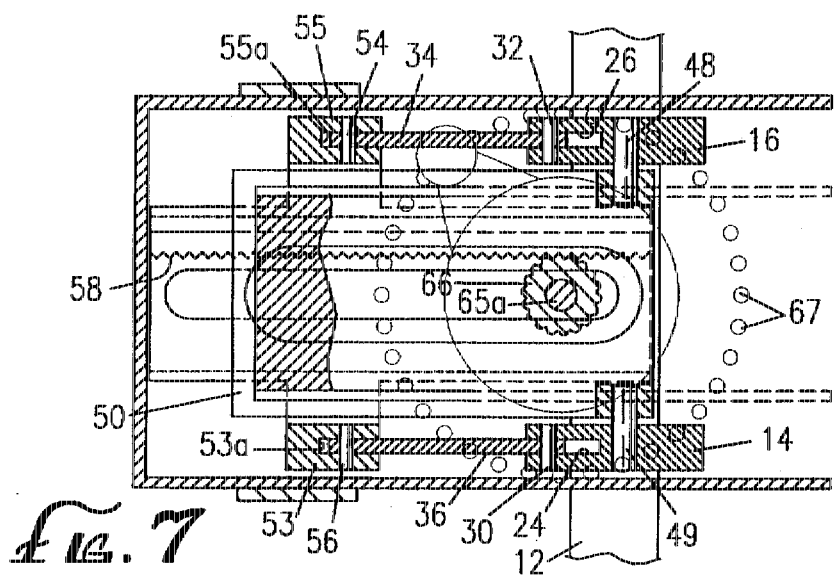
FIG. 7 is a cross-sectional view of the assembly of FIG. 6 taken along line 7—7.

FIGS. 1A–1D generally illustrate a camera system incorporating a matte box support assembly according to the preferred embodiment. FIGS. 1A–1D also illustrate four positions demonstrating functional aspects of the matte box support assembly. In all the figures, a camera 1 has a lens 2 mounted thereon with a matte box assembly 5 positioned in front of the lens 2. A bellows 6 on the back end of the matte box assembly 5 is expandable to enclose the end of the lens 2 to surround the lens to prevent stray light from entering. The matte box 5 is supported by iris rods 7 (only one iris rod being shown in these figures) via the matte box support assembly 10. The matte box support assembly 10 is mounted to the iris rod 7 by locking collar 8 to permit axial adjustment of the assembly 10 thereon. The assembly 10 includes a mounting bracket 9 which attaches directly onto the iris rod 7 and a main support bracket 60 attached to the mount bracket 9 in a 90° relationship. The support arm 16 attached to the matte box frame is allowed to be adjusted via operation of the crank arm 64 and the link arms 34, 36 within the matte box support assembly. By operation of the crank arm, the matte box is moved axially between a position illustrated in FIG. 1A closest to and surrounding the lens 2 to a position illustrated in FIG. 1B where the matte box bellows 6 is separated from the lens 2. Once in the fully extended position as shown in FIG. 1B, the support pivots the matte box away as shown in FIG. 1C and continuing to a position at 90° as shown in FIG. 1D from its original position on the lens 2.

FIGS. 2–11 illustrate details of a first embodiment for a matte box support assembly 10. The support assembly 10 includes a main bracket 60 which is generally U-shaped plate with a central dovetail 62 axially extending along an inner face thereof. The dovetail 62 (shown as a male dovetail) mates with a female dovetail 42 on a first support bracket 40. The first support bracket 40 is thereby supported onto the main bracket 60 and axially translatable via the mating dovetails 42, 62. The range of axial translation of the first support section 40 relative to the main bracket 60 is set by the end 40a of the first support section 40 contacting the end of the main bracket 60 nearest the support arm 9. The axial translation in the extended position outward from the main bracket 60 is determined by the pins 66a, 66b in the main bracket 60 coming into contact with respective ends of the slots 47a, 47b in the first support section 40.

The matte box frame 12 is mounted onto the first support section 40 via arms 16, 14. The arms 16, 14 are pivotally supported on pins 48, 49 on the first support section 40. The pins 48, 49 may be installed by positioning respective support arms to align the pivot holes 18 and 20 with the respective holes 43 in the first support section 40. The pins 48, 49 are threaded on one end thereof and threadedly attached to the respective female threads within the pivot holes 18, 20. Via pins 48, 49, the matte box support frame 12 is pivotally supported onto the first support section 40.

A second support section 50 having male dovetails 52 is slidedly mounted within the female dovetails 44 of the first support section 40. The second support section 50 includes arm sections 53, 55 extending vertically therefrom, each of which having slots 53a, 55a for accommodating the respective link arms 36, 34. One end of link arm 34 is pivotally secured by a pin 54 within slot 55a and the opposite end of the link arm 34 is disposed in a slot 26 in support arm 16 secured by pivot pin 32. One end of link arm 36 is pivotally secured by a pin 56 within the slot 53a with the other end disposed in slot 24 in support arm 14 secured by pivot pin 30.

The second support section 50 includes a toothed gear rack 58 (or other suitable linear connector such as a chain, cable or belt) which is driven by a drive sprocket or gear 66 mounted on a crank shaft 65a which may be rotated by the crank arm 65. Rotation of the gear 66 axially translates the second support section 50 in direction depending upon the rotational direction of the drive gear 66. Though the teeth of the sprocket or gear 66 provide for a positive drive action, other suitable drive mechanisms may be utilized.

As best shown in FIGS. 3 and 12, the crank arm 65 is operated via a crank arm handle 64 allowing for manual actuation of the crank arm 65. The position of the crank arm 65 may be secured, thereby locking the matte box frame 12 in a desired position. The crank arm handle 64 is mounted on a shaft 64a which is spring loaded by a spring 64c bias to urge the crank arm handle inwardly urging a ball 64b into one of the locking indentations or holes 67 in the main bracket 60. Preferably the shaft 64a and ball 64b are of one-piece construction so that by pulling outward on the handle 64 will move the ball 64b out of the hole 67.

Figure 8:
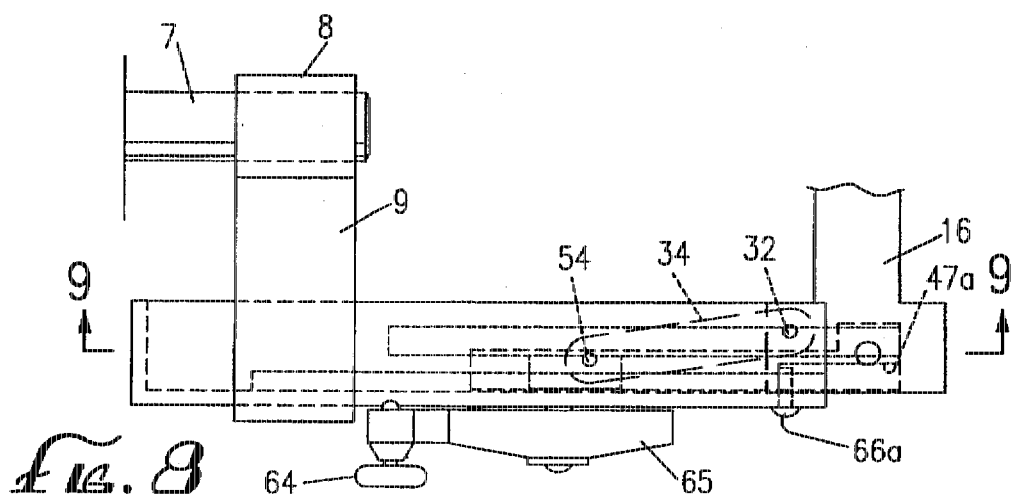
FIG. 8 is a detailed top plan view of the crank arm portion of the assembly in the position as in FIG. 1B.
Figure 9:
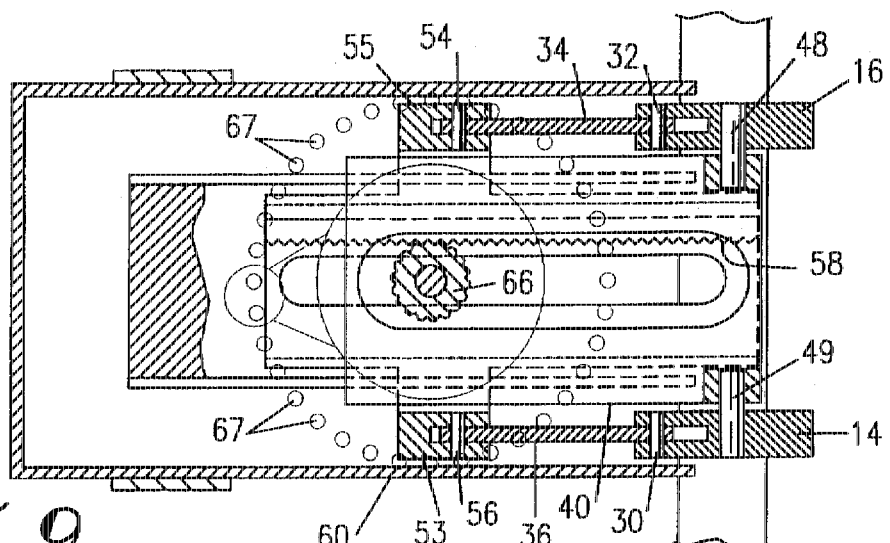
FIG. 9 is a cross-sectional view of the assembly of FIG. 8 taken along line 9—9.
Figure 10:
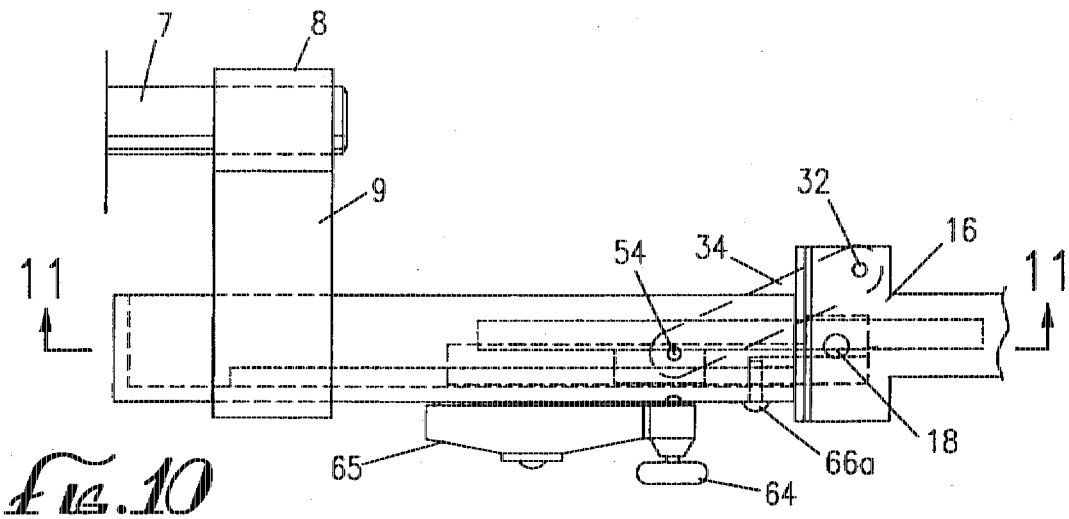
FIG. 10 is a detailed top plan view of the crank arm portion of the assembly in the position as in FIG. 1D.
Figure 11:
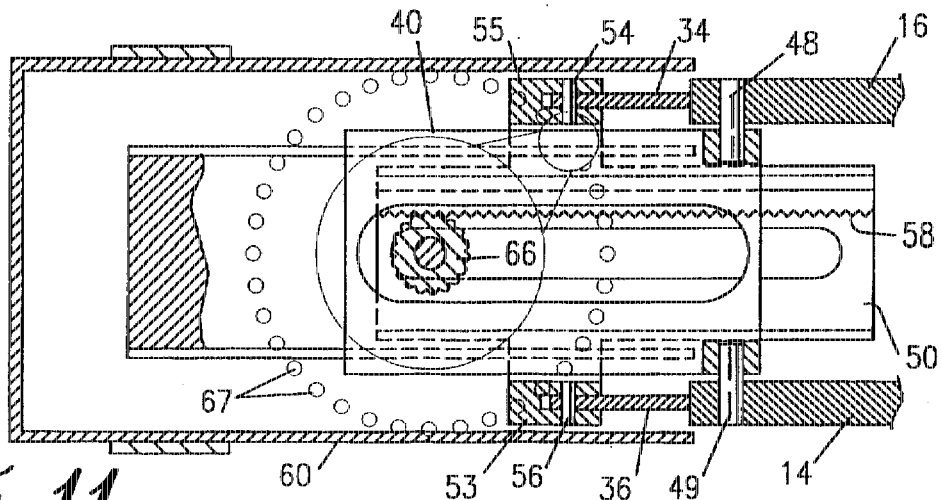
FIG. 11 is a cross-sectional view of the assembly of FIG. 10 taken along line 11—11.
Figure 16:
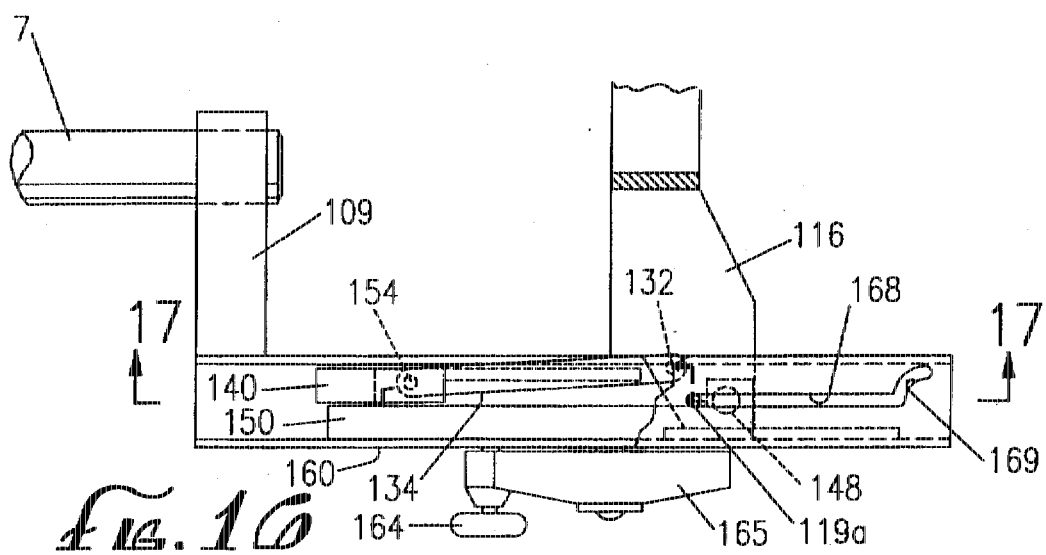
FIG. 16 is a detailed top plan view of the crank arm portion of the assembly in the fully contracted axial position.
Figure 17:
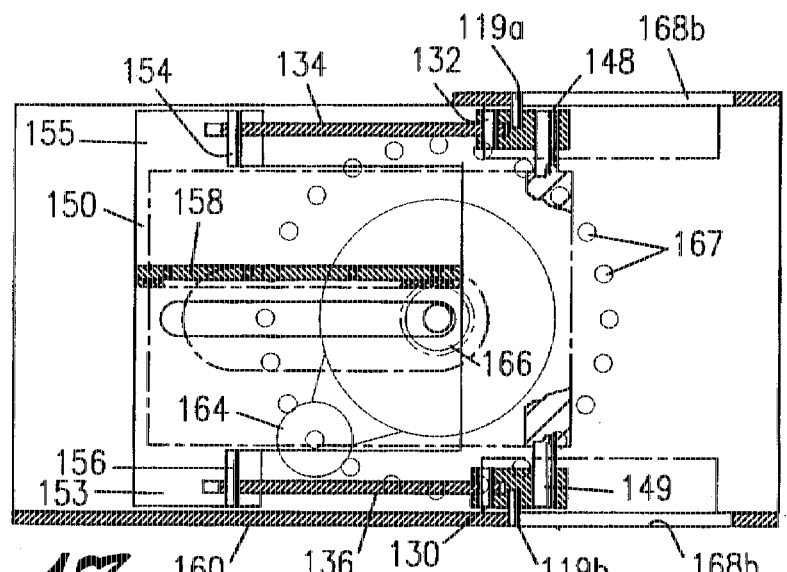
FIG. 17 is a cross sectional view of FIG. 16 taken along line 17—17.

Via the connection of link arms 34 and 36 between the arms 53, 55 on the second support section 50 and the T-shaped support arms 16 and 14 on the matte box frame 12, the axial movement of the second support section 50 drives the movement of the matte box frame 12. The support arms 16, 14 are provided with slide surfaces 22, 23 for reducing friction and for providing stability for the matte box assembly 5 while it is in proximity to the lens 2, i.e., from the positions shown in FIGS. 1A and 1B and in between. The support arms 16 and 14 have a T-shape wherein the top or head of the "T" rides or slides against an inner surface of the main bracket 60. As the second support section 50 is axially translated, the link arms 34, 36 in turn move the frame 12 which in turn causes axial translation of the first support section 40. Because the T-shaped support arms 16, 14 are disposed with the slide surfaces 22, 23 against the inside of the main bracket 60, the support arm 16, 14 cannot pivot about the pivots 18, 20 (as shown by the position in FIGS. 1A, 6 and 7) until the support arms 16, 14 clear the outer edge of the main bracket 60, a position which is shown in FIGS. 1B, 8 and 9. Therefore, a movement of the first support section 40 and the matte box frame 12 is entirely axially coextensive with the axial movement of the driven second support section 50 from the position shown in FIGS. 1A and 6 to the position shown in FIGS. 1B and 8. Once reaching the fully extended position as shown in FIGS. 1B and 8, the support arms 16 and 14 are free to rotate about the pivots 32, 30. The pivots 32, 30 are offset from the first pivots 18, 20 (note the angle of the support arm 34 being about 15° from the horizontal direction of movement as shown in FIG. 8). The maximum axial travel of the first support section 40 is set by the position of the slots 47a, 47b in the first support section. Pins 66a, 66b in the main bracket 60 extend into the slots 47a, 47b and once the ends of the slots 47a, 47b reach the pins 66a, 66b the axial translation of the first support section is halted. Once the axial translation of the first support section 40 is halted (as shown in FIG. 8), due to the offset nature of the pivot 32 relative to the pivot 18 and since the T-shaped support arms 16, 14 have cleared the edge of the main bracket 60, the support arms 16, 14 are urged to pivot by the link arms 34, 36 causing the matte box frame 12 to pivot about the pivots 18, 20 as shown in FIG. 1C. As the second support section 50 continues to be axially translated, the matte box frame 12 may be pivoted a full 90° to a position as shown in FIGS. 1D and 10. The pivoting of the matte box frame 12 is halted when the slide surface 22, 23 comes into contact with the outer edge of the main bracket 60.

The dovetail configurations for supporting and allowing axial translation of the first support section 40 and the second support section 50 relative to each other and relative to the main bracket provides for both secure support and relatively low friction movement. Touching surfaces of the dovetails are preferably surface treated to minimize friction and wear between contacting surfaces. The preferred surface treatment is magnetized surfacing (a dry lubrication surface treatment) such as available from General Magnaplate of Ventura, Calif. Alternately, a suitable Teflon™ coated surface or polymer coated surface may be employed. Though other lubricants may be used, the dry self-lubricating systems are preferred so as to avoid introduction of contaminants into the system. If spacing permits, bearings could be provided between the moving parts. The inside surface of the support arms 16, 14 is a relatively high friction area and therefore slide inserts 22, 23 are preferably provided. The slide surfaces 22, 23 may be prepared by mere surface treatment of the support arms or may actually be separate shims or inserts (e.g. of brass or graphite) secured to the support arms by recessed screws as illustrated or by a suitable adhesive.

FIGS. 12–20 illustrate an alternative embodiment for a drive and translation mechanism of a matte box assembly. The matte box 105 is supported via the iris rod 7 and support bracket 109. The main bracket 160 is a generally U-shaped plate with a central dovetail 162 axially extending along an inner face thereof. The dovetail 162 (shown as a male dovetail) mates with a female dovetail 142 on a first support bracket 140. The first support bracket 140 is thereby supported onto the main bracket 160 and is axially translatable via the mating dovetails 142, 162.

The matte box frame 112 is mounted onto a first support section 140 via support arms 116, 114. The support arms 116, 114 are pivotally supported on pins 148, 149 in respective pivots 118 and 120. The pins 148 and 149 may be secured in position by transverse locking screws (not shown).

The second support section 150 is mounted to the first support section 140 via a dovetail 144 on the first support section 140 mating with a dovetail 152 on the second support section 150. The second support section 150 includes top and bottom support arms 153, 155 extending vertically outward therefrom, each support arm having slots 153a, 155a for accommodating the respective link arms 134, 136. One end of link arm 134 is pivotally secured by a pin 154 within slot 155a and the opposite end of the link arm 134 is disposed in a slot 126 in support arm 116 secured by a pivot pin 132. Similarly, one end of link arm 136 is pivotally secured by a pin 156 within the slot 153a with the other end disposed in slot 124 of support arm 114 secured by a pivot pin 130.

The second support section 150 includes a toothed gear rack 158 which is driven by a drive gear or sprocket 166 mounted on a crank shaft 165a. The crank shaft 165a may be rotated by the crank arm 165. Rotation of the sprocket 166 axially translates the second support section 150 in a direction depending upon the rotational direction of the drive gear 166.

The crank arm 165 is operated via a crank arm handle 164 allowing for manual actuation of the crank arm 165. The crank arm 165 may be selectively locked in position, thereby locking the matte box frame 112 in the desired position by engagement with the holes or indentations 167 disposed in a circular pattern on the main bracket 160 below the various positions of the crank arm handle 164. The crank arm handle is provided with a suitable locking mechanism such as that described with respect to handle 64 of the previous embodiment.

Via the connection of the link arms 134 and 136 between the arms 153, 155 on the second support section 50 and the pins 132, 130 on the support arms 116 and 114 of the matte box frame 12, axial movement of the second support section drives movement of the matte box frame 112.

Figure 18:
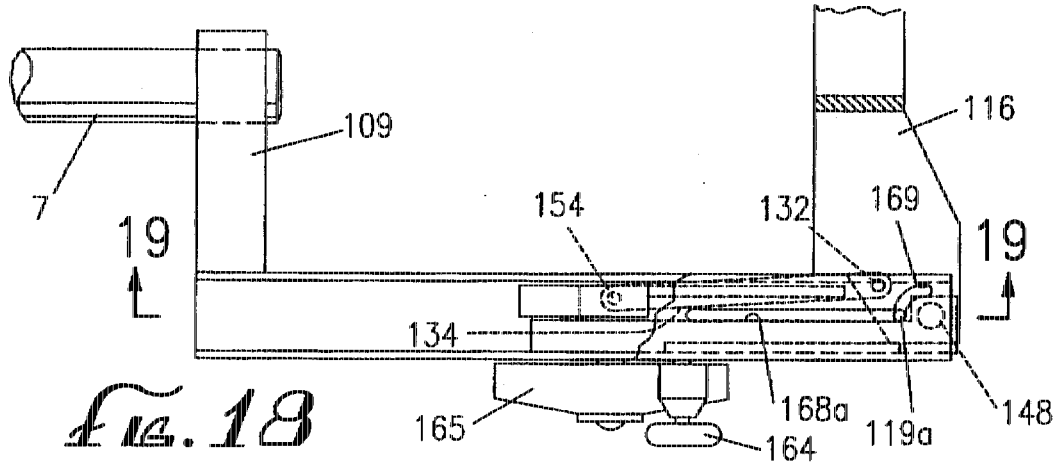
FIG. 18 is a detailed top plan view of the crank arm portion of the assembly in the fully extended axial position.
Figure 19:
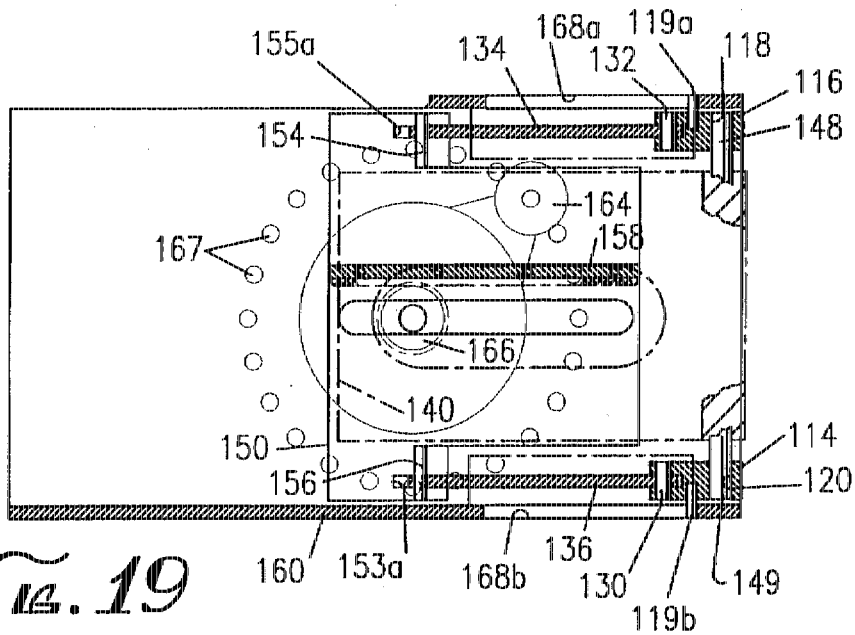
FIG. 19 is a cross sectional view of FIG. 18 taken along line 19—19.
Figure 20:
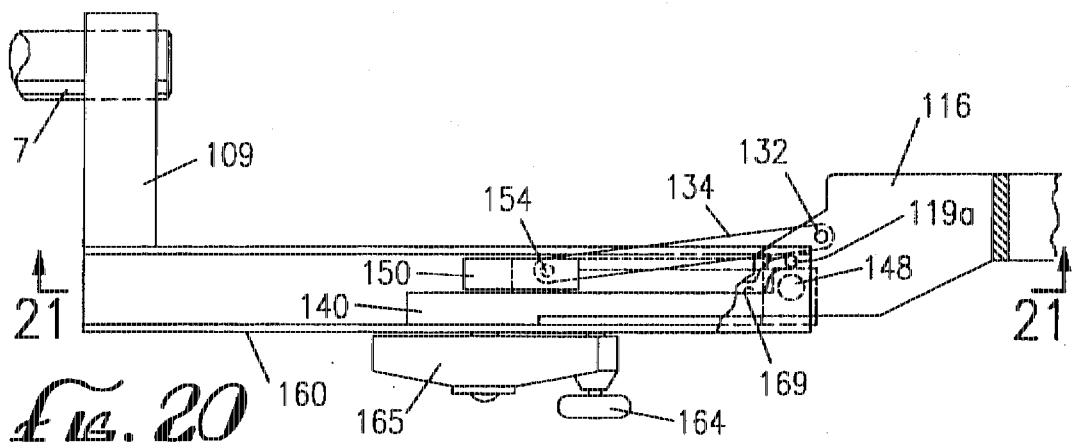
FIG. 20 is a detailed top plan view of the crank arm portion of the assembly in the fully pivoted position.
Figure 21:
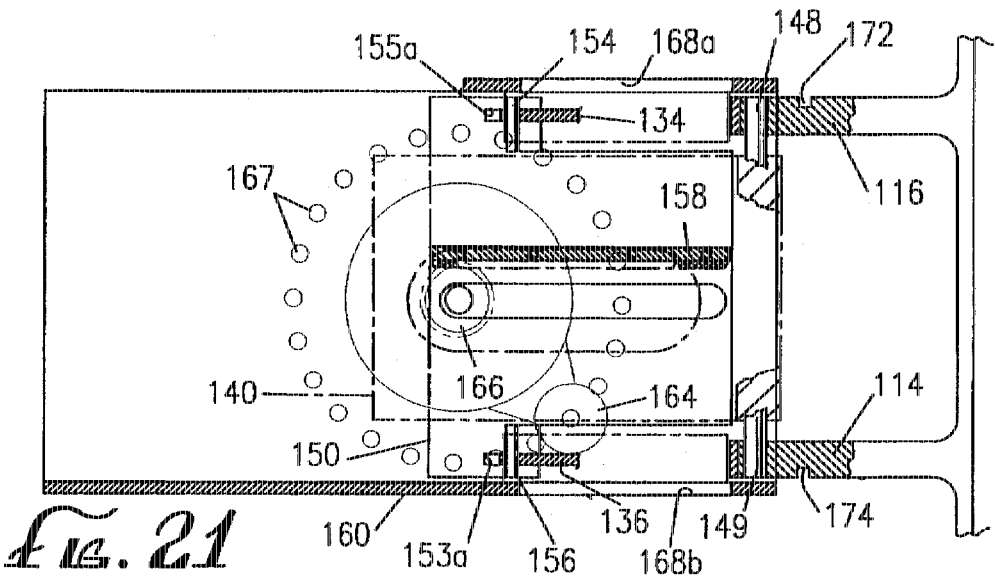
FIG. 21 is a cross sectional view of FIG. 20 taken along line 21—21.
Figure 22:
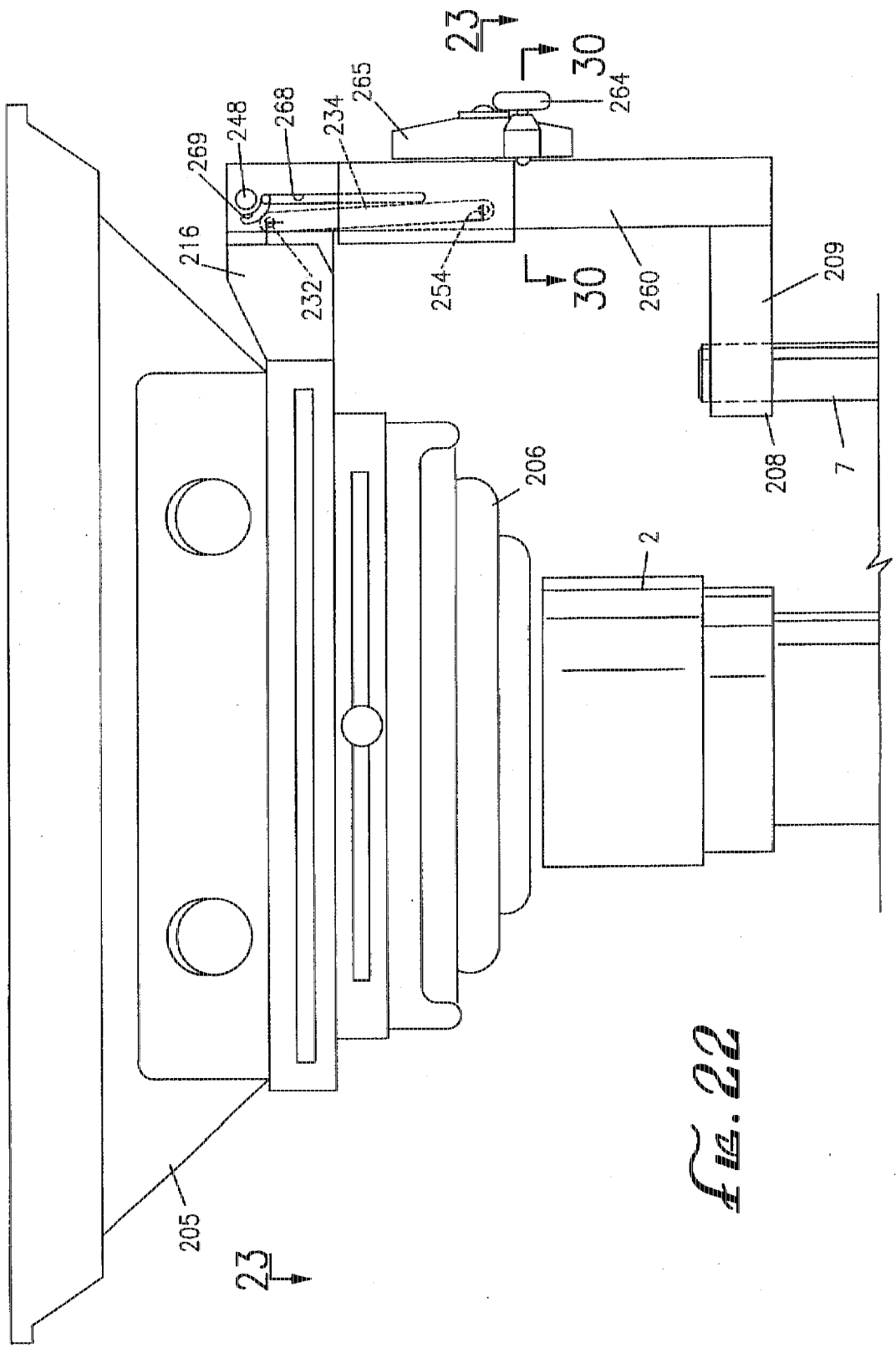
FIG. 22 is a top plan view of an alternate embodiment of a matte box assembly with the matte box axially adjacent the lens.
Figure 23:
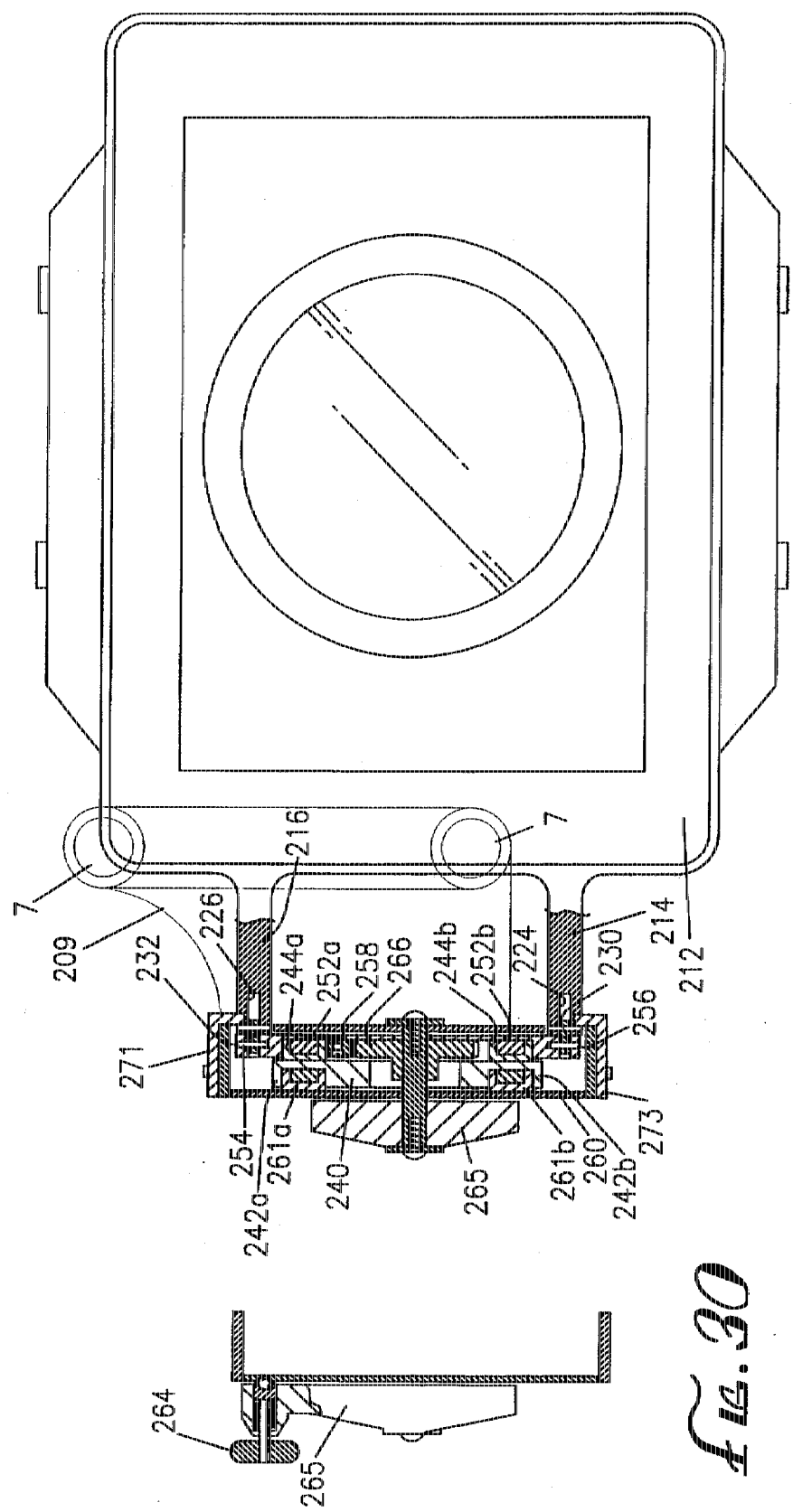
FIG. 23 is a cross sectional view of FIG. 22 taken along line 23—23.
Figure 24:
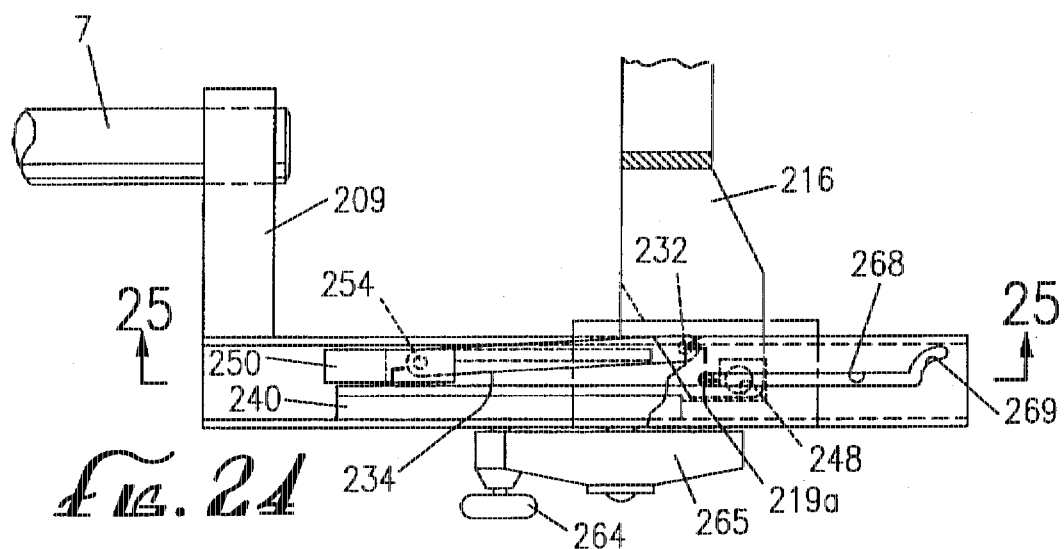
FIG. 24 is a detailed top plan view of the crank arm portion of the assembly in the fully contracted axial position.
Figure 25:
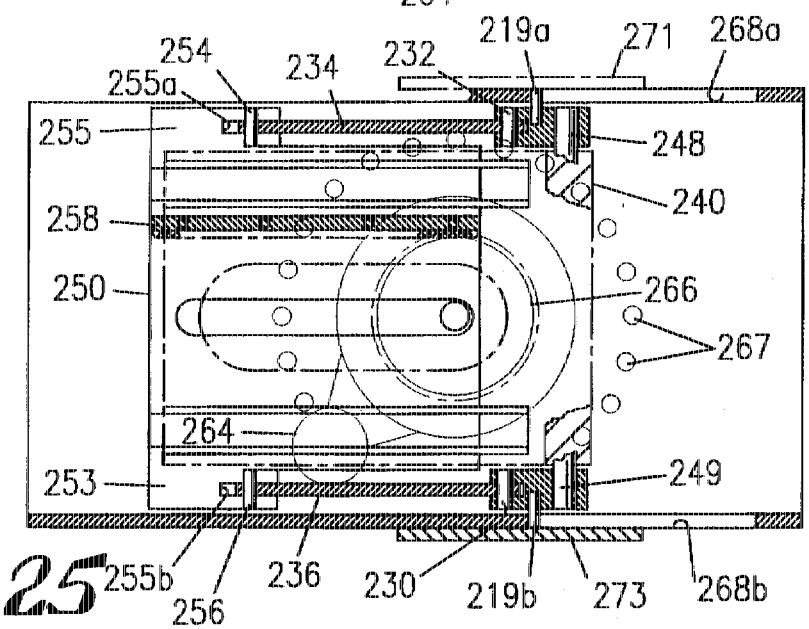
FIG. 25 is a cross sectional view of FIG. 24 taken along line 25—25.

In order to improve stability of the support arms 116, 114 during axial movement, angle brackets 171, 173 may be provided on top and bottom surfaces of the main bracket 160. The angle brackets 171, 173 have legs which extend into respective axial channels 172, 174 in the support brackets 116, 114 (see FIG. 15). As the second support section 150 is axially translated, the link arms 134, 136 in turn move the frame 112 thereby causing axial translation of the first support section 140. Because the angle brackets 171, 173 are disposed in the channels 172, 174, the support arms 116, 114 cannot pivot about the pivot pins 148, 149 until the support arms 116, 114 clear the outer edge of the angle brackets 171, 173, i.e., the position shown in FIG. 18. Further stabilizing action is provided by stabilizing pins 119a, 119b mounted on the support arms 116, 114; the pins 119a, 119b travel along axial channels 168a, 168b in the main bracket 160. As the support arms 116, 114 are axially translated from the position shown in FIGS. 16 and 17, the stabilizing pins 119a, 119b slide along the channels 168a, 168b, until the pins hit the end of the channel (as shown in FIG. 18). From that position, the pins can only move forward along the arcuate channel portion 169 of each respective channels 168a, 168b. Therefore, movement of the first support section 140 and the matte box frame 112 is entirely axially coextensive with the axial movement of the driven second support section 150 from the position shown in FIG. 16 to the position shown in FIG. 18. Once reaching the fully extended position as shown in FIG. 18, the support arms 116, 114 are free to rotate about the pivots 148, 149. The pivots 148, 149 are offset from the first pivots 132, 130 (note the angle of the support arm 134 being about 10° from the horizontal direction of movement as shown in FIG. 18). The maximum axial travel of the first support section 140 is set by the position of the slots 168a, 168b relative to the pins 119a, 119b. Once the axial translation of the first support section 140 is halted (at the position shown in FIG. 18), due to the offset nature of the pivot 132 relative to the pivot 148 and since the angle brackets 171, 173 have cleared the channels 172, 174, the support arms 116, 114 are urged to pivot by the link arms 134, 136 causing the matte box frame 112 to pivot about the pivots 148, 149. As the second support section 150 continues to be axially translated, the matte box frame 112 may be pivoted a full 90° as shown in FIGS. 20–21 (the guide pins 119a, 119b sliding along the arcuate sections 169 of the slots 168a, 168b). The pivoting of the matte box frame 112 is halted when the pins 119a, 119b reach the end of arcuate slots 169.

Similar to the previous embodiment, the dovetail configurations for supporting and allowing axial translation of the first support section 140 and the second support section 150 relative to each other and relative to the main bracket provides for both secure support and relatively low friction movement. Touching surfaces may be treated or coated as in the previous embodiment. Spacing permits, bearings could be provided between the moving parts. The inside surface of the main bracket 160 adjacent the support arms 116, 114 is a relatively high friction area and therefore slide inserts 122, 123 may be provided. The slide inserts 122, 123 may be prepared by mere surface treatment of the support arms (or the main bracket) or may actually be separate shims or inserts (e.g. of brass or graphite) secured to the support arms by recessed screws, suitable adhesive, or the like.

FIGS. 21–29 illustrate another alternative embodiment for a drive and translation mechanism of a matte box assembly. The matte box 205 is supported via the iris rod 7 and support bracket 209. The main bracket 260 is a generally U-shaped plate with a brackets 261a, 261b axially extending along an inner face thereof. The brackets 261a, 261b mate with respective female channels 242a, 242b on a first support bracket 240. The first support bracket 240 is thereby supported onto the main bracket 260 and is axially translatable via the mating brackets 261a & b and channels 242a & b.

The matte box frame 212 is mounted onto a first support section 240 via support arms 216, 214. The support arms 216, 214 are pivotally supported on respective pivot pins 248 and 249. The pins 248 and 249 may be secured in position by transverse locking screws (not shown).

The second support section 250 is mounted to the first support section 240 via mating channel connection comprising channels 244a, 244b on the first support section 240 mating with brackets 252a, 252b on the second support section 250. The second support section 250 includes top and bottom support arms 253, 255 extending vertically outward therefrom, each support arm having slots 253a, 255a for accommodating the respective link arms 234, 236. One end of link arm 234 is pivotally secured by a pin 254 within slot 255a and the opposite end of the link arm 234 is disposed in a slot 226 in support arm 216 secured by a pivot pin 232. Similarly, one end of link arm 236 is pivotally secured by a pin 256 within the slot 255b with the other end disposed in slot 224 of support arm 214 secured by a pivot pin 230.

The second support section 250 includes a toothed gear rack 258 which is driven by a drive gear or sprocket 266 mounted on a crank shaft 265a. The crank shaft 265a may be rotated by the crank arm 265. Rotation of the sprocket 266 axially translates the second support section 250 in a direction depending upon the rotational direction of the drive gear 266.

The crank arm 265 is operated via a crank arm handle 264 allowing for manual actuation of the crank arm 265. The crank arm 265 may be selectively locked in position, thereby locking the matte box frame 212 in the desired position by engagement with the holes or indentations 267 disposed in a circular pattern on the main bracket 260 below the various positions of the crank arm handle 264. The crank arm handle is provided with a suitable locking mechanism such as that described with respect to handle 64 of the first embodiment.

Via the connection of the link arms 234 and 236 between the arms 253, 255 on the second support section 50 and the pins 232, 230 on the support arms 216 and 214 of the matte box frame 22, axial movement of the second support section drives movement of the matte box frame 212.

Figure 26:
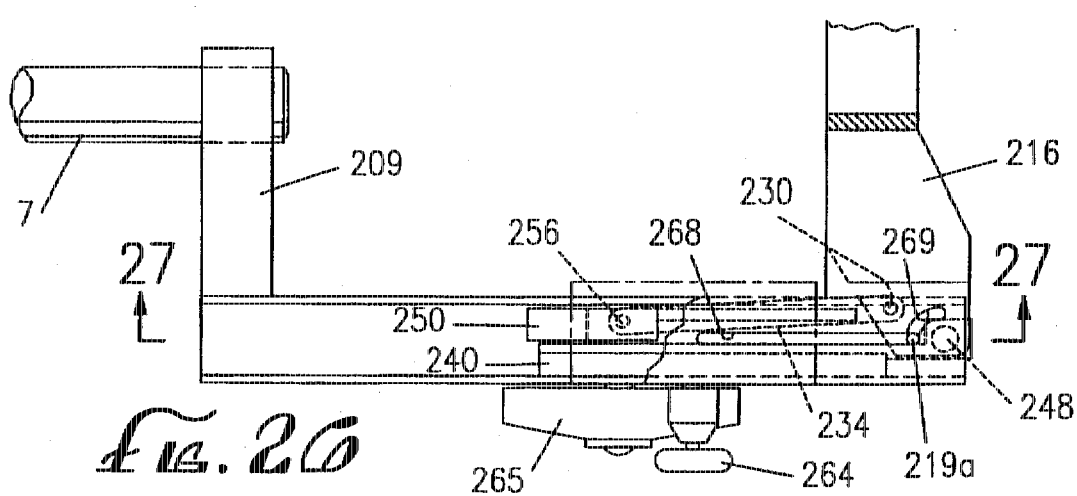
FIG. 26 is a detailed top plan view of the crank arm portion of the assembly in the fully extended axial position.

In order to improve stability of the support arms 216, 214 during axial movement, angle brackets 271, 273 are provided on top and bottom surfaces of the main bracket 260. The angle brackets 271, 273 have legs which extend into respective axial channels 272, 274 in the support brackets 216, 214 (see FIGS. 23 & 29). As the second support section 250 is axially translated, the link arms 234, 236 in turn move the frame 212 thereby causing axial translation of the first support section 240. Because the angle brackets 271, 273 are disposed in the channels 272, 274, the support arms 216, 214 cannot pivot about the pivots 248, 240 until the support arms 216, 214 clear the outer edge of the angle brackets 271, 273, i.e., the position shown in FIG. 26. Further stabilizing action is provided by stabilizing pins 219a, 219b mounted on the support arms 216, 214; the pins 219a, 219b travel along axial channels 268a, 268b in the main bracket 260. As the support arms 216, 214 are axially translated from the retracted position shown in FIGS. 24–25, the stabilizing pins 219a, 219b slide along the channels 268a, 268b, until the pins hit the end of the channel (as shown in FIG. 26). From that position, the pins can only move forward along a path of the arcuate channel portion 269 of each respective channels 268a, 268b. Therefore, movement of the first support section 240 and the matte box frame 212 is entirely axially coextensive with the axial movement of the driven second support section 250 from the position shown in FIG. 24 to the position shown in FIG. 26. Once reaching the fully extended position as shown in FIG. 26, the support arms 216, 214 are free to rotate about the pivots 248, 249. The pivots 248, 249 are offset from the first pivots 232, 230 (note the angle of the support arm 234 being about 10° from the horizontal direction of movement as shown in FIG. 26). The maximum axial travel of the first support section 240 is set by the position of the slots 268a, 268b relative to the pins 219a, 219b. Once the axial translation of the first support section 240 is halted (at the position shown in FIG. 26), due to the offset nature of the pivot 232 relative to the pivot 248 and since the angle brackets 271, 273 have cleared the channels 272, 274, the support arms 216, 214 are urged to pivot by the link arms 234, 236 causing the matte box frame 212 to pivot about the pivots 248, 249. As the second support section 250 continues to be axially translated, the matte box frame 212 may be pivoted a full 90° as shown in FIGS. 28–29 (the guide pins 219a, 219b sliding along the arcuate sections 269 of the slots 268a, 268b). The pivoting of the matte box frame 212 is halted when the pins 219a, 219b reach the end of arcuate slots 269.

Alternatively to the dovetail configurations in the previous embodiments, the rectangular channels provide support and allow axial translation of the first support section 240 and the second support section 250 relative to each other and relative to the main bracket 260 provides for both secure support and relatively low friction movement. Touching surfaces may be treated or coated as in the previous embodiment. If spacing permits, bearings could be provided between the moving parts or alternately be incorporated into the channel connections themselves.

While embodiments and applications of this invention have been shown and described, it would be apparent to those skilled in the art that other modifications are possible without departing from the inventive concepts herein. The invention, therefore, is not to be restricted except in the spirit of the claims that follow.

What is claimed is:

1. A matte box assembly for a camera, comprising
   a main bracket;
   a first support section supported on the main bracket and axially translatable thereto;
   a second support section supported on the first support section and axially translatable thereto;
   a matte box movably mounted on the first support section about a first pivot;
   a link arm having a first end pivotally connected to the second support section and a second end pivotally connected to the matte box at a second pivot offset from the first pivot.

2. A matte box assembly according to claim 1 further comprising a drive mechanism including
   (a) an axial drive mechanism for axially translating the first support section relative to the main bracket by a desired amount within a predetermined range, and (b) a pivot drive mechanism for pivoting the matte box on the first support section selectively toward and away from the camera.

3. A matte box assembly according to claim 2 wherein the drive mechanism includes a stop at a travel limit of the predetermined range, whereby the stop is engaged once the drive mechanism has axially translated the first and second support sections the predetermined range thereby causing the drive mechanism to actuate the pivot mechanism thereby pivoting the matte box away from the camera.

4. A matte box assembly according to claim 2 wherein the drive mechanism comprises a single actuator which operates both the axial translation and the pivoting action of the matte box.

5. A matte box assembly according to claim 4 wherein the actuator sequentially operates the axial translation and the pivoting action.

6. A matte box assembly according to claim 4, wherein the actuator comprises a manually-operated actuator.

7. A matte box assembly according to claim 6 wherein said actuator comprises a manually-actuable crank arm.

8. A matte box assembly according to claim 6 wherein the actuator comprises a crank handle having lock steps for securing the crank handle to lock the matte box in a desired position.

9. A matte box assembly according to claim 1 further comprising a drive mechanism which sequentially provides for axial translation of the matte box over a predetermined range, and provides a pivoting action of the matte box on the first support section toward and away from the camera.

10. A matte box assembly according to claim 1 further comprising linear bearings disposed between the first support section and the second support section for permitting the axial translation of the second support section relative to the first support section.

11. A matte box assembly according to claim 1 further comprising a dovetail connection between the first support section and the second support section for permitting the axial translation of the second support section relative to the first support section.

12. A matte box assembly according to claim 1 wherein the main bracket is mountable to the camera via iris rods.

13. A matte box assembly according to claim 12 further comprising locking collars for locking the main bracket in a desired axial position along the iris rods.

14. A matte box assembly according to claim 1 further comprising
 a channel formed in the first support section, the channel arranged longitudinally and having a straight section and a curved section;
 a drive arm having a first end pivotally attached to the matte box via a pivot shaft and a second end pivotally attached to the second support section, the pivot shaft having one shaft end disposed in the channel for guiding the matte box axially while the one shaft end slides along the straight section of the channel and for pivoting the matte box while the one shaft end slides along the curved section.

15. A matte box assembly according to claim 1 wherein the matte box is pivotally mounted to the second support section via a shaft and having a channel formed in the first support section, the channel arranged longitudinally and having a straight section and a curved section;
 a drive arm having first end pivotally attached to the matte box via a pivot shaft and a second end pivotally attached to the second support section, the pivot shaft having a shaft end disposed in the channel for guiding the matte box axially while the shaft end slides along the straight section of the channel and for pivoting the matte box while the shaft end slides along the curved section.

16. A matte box assembly according to claim 1 further comprising
 a rack gear mounted on the second support section;
 a pinion gear rotatably mounted on the first support section and positioned to engage the rack gear;
 a crank arm connected to the pinion gear, wherein rotation of the pinion gear drives the rack gear to axially translate the second support section.

17. A matte box assembly according to claim 1 further comprising a support arm attached to the matte box, and a drive arm having a first end pivotally attached to the second support section and a second end attached to the support arm.

18. A camera system comprising:
 a camera;
 a camera support upon which the camera is removably mounted;
 a lens assembly removably mounted to the camera;
 a matte box assembly movably positioned in front of the lens assembly, comprising
 a main bracket,
 a first support section mounted to the main bracket and axially movable thereto,
 a matte box pivotally mounted to the first support section,
 a drive mechanism for axially translating the first and second support section a desired amount within a predetermined range and once the first support section has been translated the predetermined range, for pivoting the matte box away from the camera.

19. A camera system according to claim 18 wherein the drive mechanism comprises a single actuator which provides for both the axial translation and the pivoting action.

20. A camera system according to claim 18 wherein the actuator sequentially operates the axial translation and the pivoting action.

21. A camera system according to claim 18 wherein the drive mechanism comprises a single manually-operated actuator which provides for both the axial translation and the pivoting action.

22. A camera system according to claim 19 wherein said actuator comprises a manually-actuable crank arm.

23. A camera system according to claim 18 wherein the actuator comprises a crank handle having lock steps for securing the crank handle to lock the matte box in a desired position.

24. A camera system according to claim 19 further comprising a drive mechanism which sequentially provides for axial translation of the matte box over a predetermined range, and provides a pivoting action of the matte box on the first support section toward and away from the camera.

25. A camera system according to claim 18 further comprising iris rods mountable to the camera system constructed and arranged to mount the main bracket to the camera system independent from the lens assembly.

26. A camera system including a matte box assembly for use on cameras for supporting a plurality of filters, the matte box assembly comprising matte box and a support bracket which (1) supports the matte box and which (2) axially translates toward and away from the lens and (3) in a separate action, once it has been axially translated away from the lens, the support bracket pivots 90° away from the lens, the matte box assembly including a crank arm for actuating both axial translation and pivoting action of the support bracket sequentially.

27. A method of controlling position of a matte box assembly for use in front of a lens on a camera, comprising the steps of operating an actuation mechanism to axially translate the matte box to a desired position between a fully contracted position to a fully extended position;

operating the actuation mechanism to pivot the matte box assembly away from the lens, the actuation mechanism sequentially translating the matte box to the fully extended position and then pivoting the matte box away from the lens.

28. A matte box assembly for a camera, comprising a main bracket;

a first support section supported on the main bracket and axially translatable thereto;

a drive mechanism including (a) an axial drive mechanism for axial translating the first support section relative to the main bracket, and (b) a pivot mechanism for pivoting the matte box on the first support section selectively toward and away from the camera, wherein the drive mechanism comprises a single actuator which operates both the axial translating and the pivoting of the matte box.

* * * * *